(12) United States Patent
Huang et al.

(10) Patent No.: US 9,500,559 B2
(45) Date of Patent: Nov. 22, 2016

(54) DAMPING TESTING

(71) Applicant: DMAR ENGINEERING, INC., Houston, TX (US)

(72) Inventors: Zhiming Huang, Missouri City, TX (US); Dagang Zhang, Houston, TX (US)

(73) Assignee: DMAR Engineering, Inc., Houston, TX (US)

( * ) Notice: Subject to any disclaimer, the term of this patent is extended or adjusted under 35 U.S.C. 154(b) by 213 days.

(21) Appl. No.: 14/500,934

(22) Filed: Sep. 29, 2014

(65) Prior Publication Data
US 2015/0285706 A1 Oct. 8, 2015

Related U.S. Application Data

(60) Provisional application No. 61/976,509, filed on Apr. 8, 2014.

(51) Int. Cl.
*G01M 7/02* (2006.01)
*G01M 5/00* (2006.01)
*G01M 7/04* (2006.01)

(52) U.S. Cl.
CPC ......... *G01M 5/0058* (2013.01); *G01M 5/0066* (2013.01); *G01M 7/022* (2013.01); *G01M 7/027* (2013.01); *G01M 7/04* (2013.01)

(58) Field of Classification Search
CPC .. H01M 5/0058; H01M 5/0066; H01M 7/04; H01M 7/027; H01M 7/022
USPC .................................................... 73/579, 663
See application file for complete search history.

(56) References Cited

U.S. PATENT DOCUMENTS

| 4,443,128 | A * | 4/1984 | Yamamoto | F16B 7/04 403/385 |
|---|---|---|---|---|
| 6,260,752 | B1 * | 7/2001 | Dollesin | B60R 9/065 224/495 |
| 6,414,322 | B1 * | 7/2002 | Carroll | H01J 37/20 250/442.11 |
| 6,477,730 | B1 * | 11/2002 | Marrero | B60S 3/00 15/53.1 |
| 7,195,043 | B1 * | 3/2007 | Neff | B27F 1/005 144/144.1 |
| 9,239,339 | B2 * | 1/2016 | Kaack | G01P 15/032 |
| 9,297,221 | B2 * | 3/2016 | Huang | E21B 19/004 |
| 2012/0305106 | A1 * | 12/2012 | Morse | F16K 27/0218 137/343 |
| 2013/0043634 | A1 * | 2/2013 | Kitaura | B23Q 3/183 269/309 |
| 2014/0083190 | A1 * | 3/2014 | Kaack | G01P 15/125 73/514.14 |
| 2015/0260032 | A1 * | 9/2015 | Huang | G01N 3/08 166/336 |
| 2015/0285706 | A1 * | 10/2015 | Huang | G01M 5/0058 73/579 |

* cited by examiner

*Primary Examiner* — J M Saint Surin
(74) *Attorney, Agent, or Firm* — Liaoteng Wang

(57) ABSTRACT

Apparatus and methods related to damping testing are disclosed. For example, some embodiments may contain a testing platform supported on wheels and moveable by hydraulic cylinders, and two fasteners for fastening the testing sample, one fixed on the testing platform and the other moveable along the testing platform by another hydraulic cylinder, and may be used for the damping testing of slender structures such as umbilicals and flexibles used in oil and gas underwater field development.

9 Claims, 3 Drawing Sheets

DAMPING TESTING

CROSS REFERENCE TO RELATED APPLICATIONS

This application claims the benefit of U.S. Provisional App. No. 61/976,509, filed on Apr. 8, 2014, which is incorporated herein by reference.

FIELD OF PRESENT DISCLOSURE

This present disclosure relates to damping testing. For example, the apparatus and methods disclosed herein may be used for testing the damping characteristics of certain slender structures such as umbilicals and flexibles commonly used in underwater field development.

BACKGROUND INFORMATION

During oil and gas underwater field development, slender structures such as umbilicals and flexible are commonly used. Such slender structures can be vulnerable to underwater current induced vibration. In order to evaluate the effects of such vibrations on the slender structures, the damping characteristics of such slender structures are needed. However, the damping characteristics of the umbilicals and flexible are not well understood.

Many umbilicals and flexibles are constructed using small tube bundles or different functional layers. When these slender structures are subject to external force excitations, such as underwater current, their motions are dependent on the structure damping effect, which is related to the slender structure vibration amplitudes and frequencies. Oftentimes in the oil and gas industry, it is assumed that the damping is linear, and typically around one percent (1%) for umbilical and five percent (5%) for flexible. However, such linearized approximation is oversimplified and cannot be used to sufficiently identify the damping characteristics of the slender structures because of the complex nature of such slender structures, the damping behavior of which may not be linear. Apparatus and methods can be designed to test the damping behavior of certain umbilical and flexible samples, and the damping characteristics of such samples can be obtained to aid optimizations and applications thereof.

DETAILED DESCRIPTION

Figure 1:
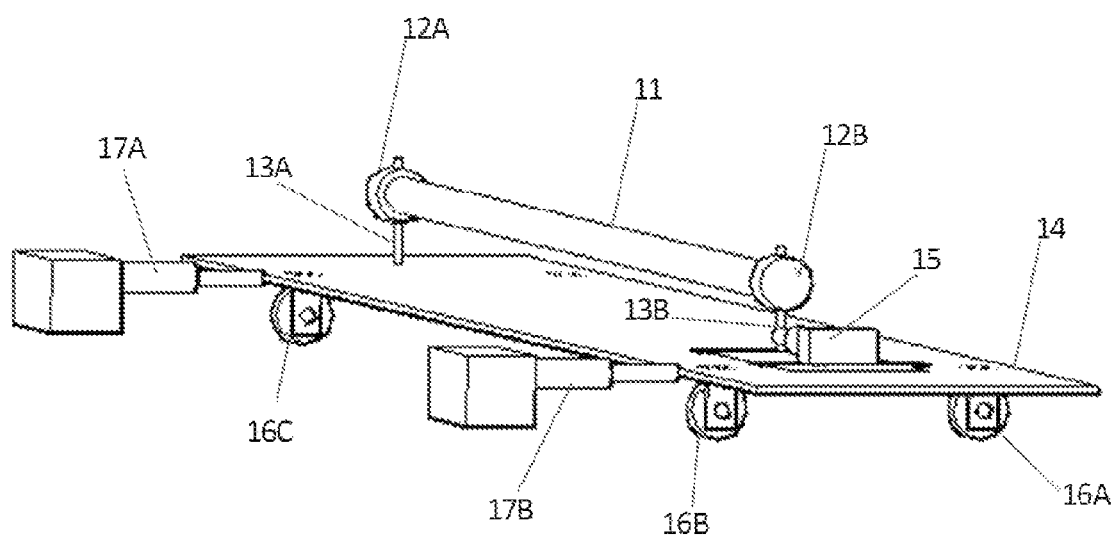
FIG. 1 is a diagram showing the overview of an embodiment of the apparatus and methods for damping testing.

This document discloses apparatus and methods related to damping testing FIG. 1 shows the overview of an implementation of the apparatus and methods for damping testing. The damping testing for a testing sample 11 can be performed on a testing platform 14. The testing sample 11 is fastened by two fasteners 12A and 12B on each end. The fasteners 12A and 12B can be clamps. The fastener 12A is pinned to the testing platform 14 through a pivot pin 13A, while the fastener 12B is connected to a pivot pin 13B attached to a sliding block 18 (shown in FIG. 2), which is further attached to an extendable and retractable arm 15. The extendable and retractable arm 15 can be a hydraulic cylinder. The testing platform 14 is supported on a plurality of wheels (16A, 16B, 16C and 16D; 16D is not shown in FIG. 1), and is controlled by one or more hydraulic cylinders (17A and 17B).

Figure 2:
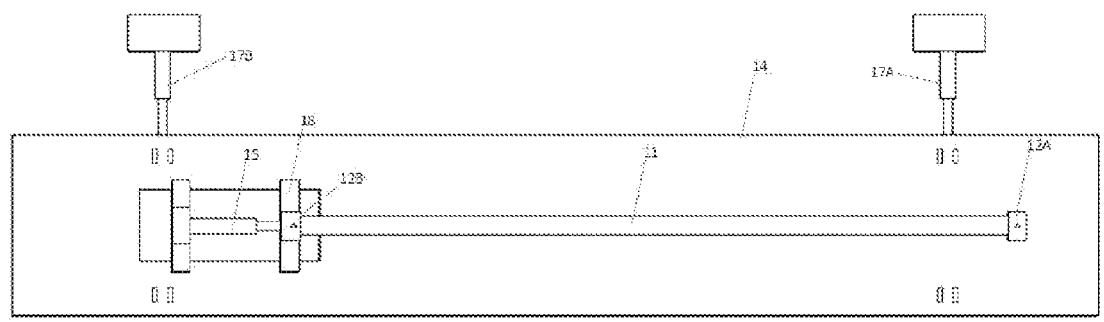
FIG. 2 is a diagram showing the top view of an embodiment of the apparatus and methods for damping testing.

FIG. 2 shows the top view of an implementation of the apparatus and methods for damping testing. The fastener 12B is connected to the top of the pivot pin 13B, and the sliding block 18 is connected to the bottom of the pivot pin 13B (shown in FIG. 1). The extendable and retractable arm 15 can control the position of the pivot pin 13B on the testing platform 14.

Figure 3:
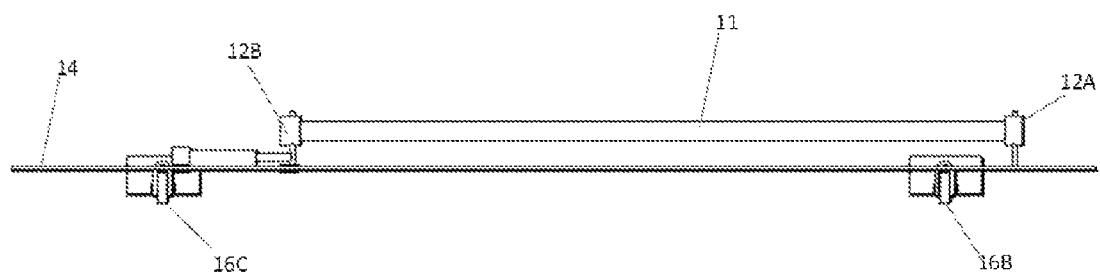
FIG. 3 is a diagram showing the elevation view of an embodiment of the apparatus and methods for damping testing.

FIG. 3 shows the elevation view of an implementation of the apparatus and methods for damping testing. The damping test for testing sample 11, fixed in position by two fasteners 12A and 12B on both ends, is performed on the testing platform 14 supported by wheels (16B and 16C).

In some implementations, the apparatus for damping testing can be about five (5) meters in length, two (2) meters in width, and one (1) meter in height. Two clamps can be used to hold the two ends of the testing sample, both of which can rotate freely through a pivot pin. One pivot pin is fixed to the testing platform, while the other pivot pin is fixed to a hydraulic cylinder. The testing platform is controlled by two hydraulic cylinders, which are able to extend and retract with predefined amplitudes and periods.

In some implementations, the damping testing can be conducted as follows: (i) fasten the two ends of the testing sample by two clamps; (ii) extend or retract the hydraulic cylinder connected (through a sliding mechanism) to the movable end of the testing sample to stretch the testing sample such that it is tensioned at a predefined value; (iii) activate the two hydraulic cylinders that control the movement of the testing platform to vibrate the testing platform in predefined amplitude and period; (iv) record the testing sample lateral deflection amplitude; and (v) derive the damping coefficient from the testing sample lateral deflection amplitude. The testing sample lateral deflection amplitude can be measured, for example, by any motion or acceleration sensors. The tests can be repeated for different tension levels and testing platform vibrating amplitudes and periods, such that the damping characteristics (for example, damping coefficient versus excitation amplitude and tension) of the testing sample can be obtained.

OTHER EMBODIMENTS

Various other adaptations and combinations of features of the embodiments and implementations disclosed are within the scope of the present disclosure. For example, the hydraulic cylinders in the present disclosure can be replaced by any of the tensioning devices that can extend and retract in a controllable way. It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An apparatus for damping testing of a testing sample, comprising:

a testing platform supported on a plurality of wheels, the testing platform moveable freely on the wheels;

a first extendable and retractable arm connected to the testing platform and configured to drive the testing platform along a first horizontal direction;

a first fastener configured to fasten a first end of the testing sample;

a first pivot pin coupling the first fastener to the testing platform, the first pivot pin configured to allow the first fastener to rotate freely along a vertical direction;

a second fastener moveable on the testing platform and configured to fasten a second end of the testing sample;

a second extendable and retractable arm configured to move the second fastener in a second horizontal direction orthogonal to the first horizontal direction to create a tension in the testing sample; and a second pivot pin coupling the second fastener to the second extendable and retractable arm, the second pivot pin configured to allow the second fastener to rotate freely along the vertical direction.

2. An apparatus according to claim 1, wherein the first or the second extendable and retractable arm is a hydraulic cylinder.

3. An apparatus according to claim 1, wherein the first or the second fastener is a clamp.

4. An apparatus according to claim 1, wherein the second fastener is attached to a sliding block through the second pivot pin.

5. An apparatus according to claim 4, wherein the sliding block is slidable along the testing platform in the second horizontal direction.

6. An apparatus for damping testing of a testing sample, comprising:

a testing platform supported on a plurality of wheels, the testing platform being moveable freely on the wheels and configured to be driven by at least one extendable and retractable arm connected to the testing platform;

a first fastener fixed on the testing platform for fastening one end of the testing sample; and a second fastener moveable on the testing platform for fastening the other end of the testing sample, the second fastener being connected with an extendable and retractable arm configured to move the second fastener to create a tension on the testing sample, wherein the apparatus is about five meters in length, two meters in width, and one meter in height.

7. A method for damping testing of a testing sample, comprising:

fastening the two ends of a testing sample with two fasteners, wherein one fastener is fixed on a testing platform that is supported on a plurality of wheels and configured to be driven by at least one extendable and retractable arm connected to the testing platform, and an other fastener is supported on the testing platform but movable by an extendable and retractable arm configured to move the other fastener to create a tension on the testing sample;

creating the tension using the extendable and retractable arm connected to the other fastener;

activating the at least one extendable and retractable arm connected to the testing platform to vibrate the testing platform with an amplitude and a period;

recording the testing sample's lateral deflection amplitude; and deriving a damping coefficient from the testing sample's lateral deflection amplitude.

8. A method according to claim 7, wherein the testing is repeated for different tension levels and testing platform vibrating amplitudes and periods.

9. A method for according to claim 7, wherein:

the at least one extendable and retractable arm is configured to drive the testing platform along a first horizontal direction;

a pivot pin couples the fastener to the testing platform, the pivot pin being configured to allow the fastener rotate freely along a vertical direction;

the extendable and retractable arm is configured to move the other fastener along a second horizontal direction orthogonal to the first horizontal direction; and an other pivot pin couples the other fastener to the extendable and retractable arm, the other pivot pin being configured to allow the other fastener rotate freely along the vertical direction.

* * * * *